US005392345A

United States Patent [19]
Otto

[11] Patent Number: 5,392,345
[45] Date of Patent: Feb. 21, 1995

[54] WORK AT HOME ACD AGENT NETWORK

[75] Inventor: Mary R. Otto, Lisle, Ill.

[73] Assignee: AT&T Corp., Murray Hill, N.J.

[21] Appl. No.: 56,232

[22] Filed: Apr. 30, 1993

[51] Int. Cl.$^6$ ............................................. H04M 7/00
[52] U.S. Cl. .................................. 379/265; 379/308;
379/309; 379/220
[58] Field of Search ............... 379/265, 266, 308, 309,
379/207, 220, 221; 370/58.2, 225

[56] References Cited

U.S. PATENT DOCUMENTS

| | | | |
|---|---|---|---|
| 4,313,036 | 1/1982 | Jabara et al. | 379/225 X |
| 5,073,890 | 12/1991 | Danielsen | 370/58.2 |
| 5,168,515 | 12/1992 | Gechter et al. | 379/309 |
| 5,206,903 | 4/1993 | Kohler et al. | 379/309 |
| 5,271,058 | 12/1993 | Andrews et al. | 379/265 X |
| 5,291,551 | 1/1994 | Conn et al. | 379/265 |
| 5,299,260 | 3/1994 | Shaio | 379/266 |

FOREIGN PATENT DOCUMENTS 076527  7/1990  European Pat. Off. ....... H04M 3/50

OTHER PUBLICATIONS

"5ESS® Switch ACD/MIS, Telemarketing Services Application Guide", AT&T Network Systems, Aug. 1990, pp. 1–106.

Primary Examiner—James L. Dwyer
Assistant Examiner—Daniel S. Hunter
Attorney, Agent, or Firm—Werner Ulrich

[57] ABSTRACT

An arrangement for providing Automatic Call Distribution (ACD) service from a mixture of local and remote agents. The remote agents are connected via a voice connection to the home switch of the ACD and voice data connection to a Home Agent Server (HAS). The HAS passes call event data to a Management Information System (MIS) of the ACD, which informs the ACD switch of call events that make a remote agent available or unavailable, and passes applications data to a host processor for serving the applications of the ACD. Advantageously, ACD service can be provided efficiently and economically from a remote server.

11 Claims, 5 Drawing Sheets

WORK AT HOME ACD AGENT NETWORK

TECHNICAL FIELD

This invention relates to arrangements for allowing physically separated agents to work as a member of an automatic call distributor (ACD) team.

1. Problem

The revolution in telecommunications is starting to make it possible to realize an old dream, that of being able to work as effectively from a home as from an office. Many people, especially those in the computer industry, are able to complete a large part of their work from work stations or personal computers in their homes. So far, however, such applications as permitting telephone agents to work from their homes have not achieved wide acceptance. Generally, it has been difficult to maintain adequate surveillance of such agents and the cost of providing telecommunications access to such agents has been sufficiently high to discourage the practice. Accordingly, a problem of the prior an is that no sound economical way has been found for allowing telephone agents that are a part of an automatic call distributor team to be physically separated from the other members of the team.

2. Solution

This problem has been solved and an advance made over the prior an in accordance with the principles of my invention, wherein a work at home agent selected to serve a call by an ACD control system is connected to the caller on an audio link, and is connected to a home agent server (HAS) unit via a data connection. The HAS unit distributes work at home agent status changes to a management information system for maintaining surveillance of the agent, and to the ACD control system so that the availability of the agent to serve a new call can be noted by the ACD control system, and transmits application data from and to a host computer for providing and accepting applications data to and from the work at home agent. Advantageously, this arrangement offers an inexpensive way of providing an audio connection to the work at home agent (the connection is maintained only for the duration of the calls to the agent), and offers the agent a single data path to obtain and accept applications data, and to provide data for updating management information system and the agent availability information for the ACD.

DETAILED DESCRIPTION

Figure 1:
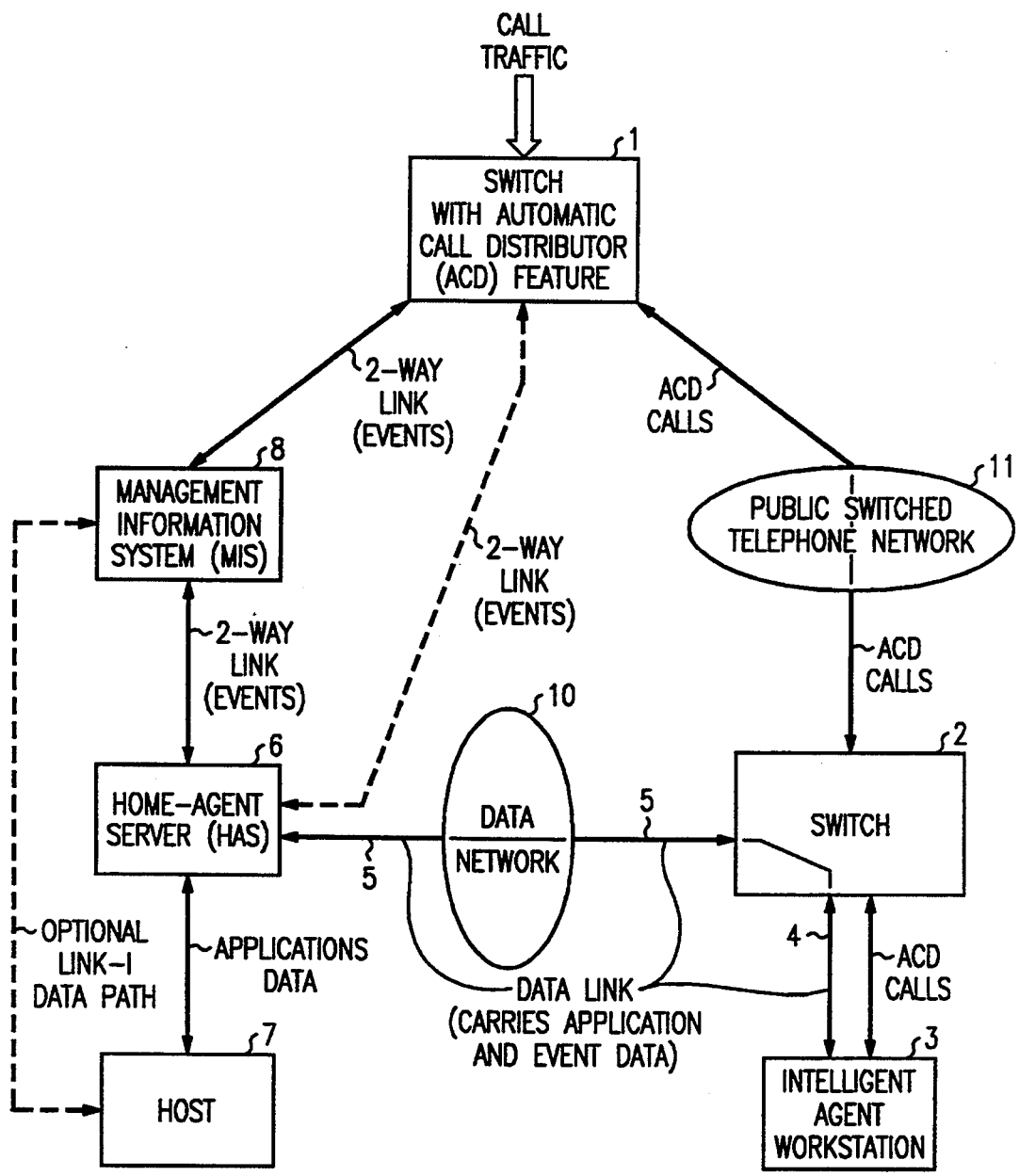
FIG. 1 is a block diagram illustrating the operation of applicant's invention.

FIG. 1 is a block diagram illustrating the operation of applicant's invention. Incoming calls go to a switch 1 which is the host switch for the automatic call distributor (ACD) which distributes calls to the agents of the called customer. This switch typically has many agents directly connected to the switch and, in accordance with the principles of this invention, has at least one agent served by another switch. This agent is served by switch number 2. The agent has an intelligent work station 3. This intelligent work station receives voice signals from switch 2 and also transmits and receives data messages over link 4 connected to switch 2 which link is continued in data link 5 and terminates at a home agent server 6. The data link carries event messages (such as answer and disconnect) and application messages (such as data for an order placed by the caller). The home agent server (HAS) 6 transmits the applications data to a host processor 7, for example, for accepting order data, and communicates via the management information system 8 to the switch 1. Alternatively, a direct link may exist between HAS 6 and switch 1.

The management information system (MIS) is used by the supervisors of the ACD to keep track of the individual work performance of the agents of the ACD and to maintain such additional data as the number of calls that are not answered and the distribution of the waiting time before calls are answered.

The switch 1 controls the functions normally performed by an ACD including queuing calls and assigning calls to particular agents, including in this case the remote agent at intelligent agent work station 3 being served by switch 2. A particular agent work station is seized in response to receipt of a call from switch 1, but the agent is made available for the next call on the basis of event data received in switch 1 from HAS 6 via the link through MIS 8 (or alternatively the direct link that may exist between HAS 6 and switch 1).

Switches 1 and 2 are connected by the public switch telephone network 11 and switch 2 is connected to home agent server by any available data network 10, such as a network accessed by dial-up arrangements, such as Compunet ® or Telenet ®.

Figure 2:
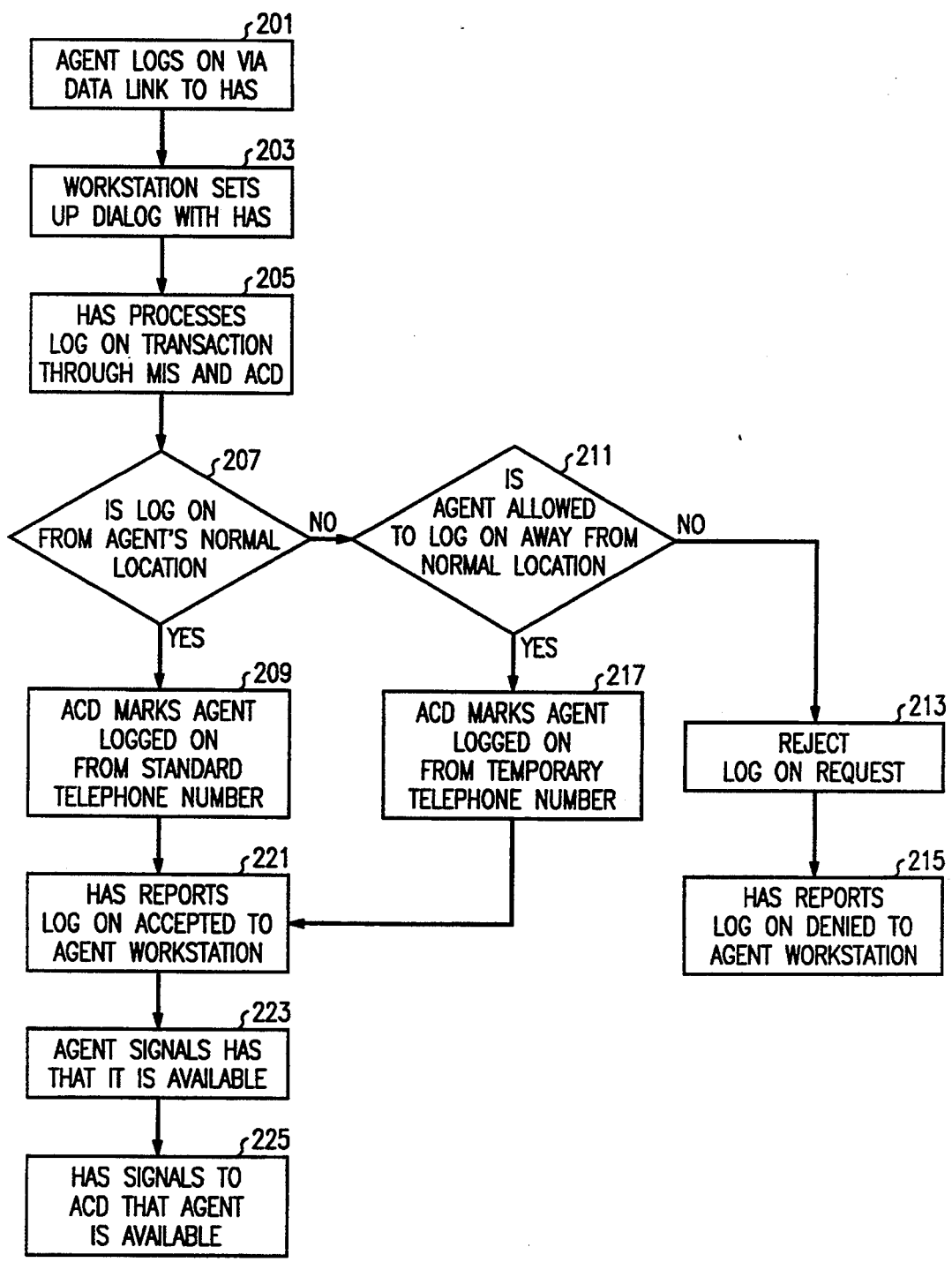
FIGS. 2-5 are flow diagrams illustrating the methods of performing the invention.

FIG. 2 is a flow diagram of the process of logging in from a remote agent work station 3. The agent logs on via the data link to the home agent server (HAS) 6 (action block 201). The work station sets up a dialog with the HAS (action block 203). The HAS processes the login transaction through MIS 8 and the ACD feature of switch 1 (action block 205). In test 207 it is determined whether the call is from the agent's normal location. If so, the ACD marks the agent logged in on the standard telephone number (action block 209). If the login is not from the agent's normal location (negative result of test 207) then test 211 is used to determine if the agent is allowed to log in away from that agent's normal location. If not, then the login request is rejected (action block 213) and the HAS reports the login denied to the agent work station (action block 215). If the agent is allowed to log in away from the normal location (positive result of test 211 ), then the ACD marks the agent logged in and records the temporary telephone number for that agent (action block 217). Following the execution of either action block 209 or 217, the HAS reports login accepted to the agent work station (action block 221). When the agent is ready, the agent then signals the HAS that it is available (action block 223). The HAS then signals the ACD that the agent is available (action block 225) and the agent is marked as being available for calls by the ACD.

Figure 3:
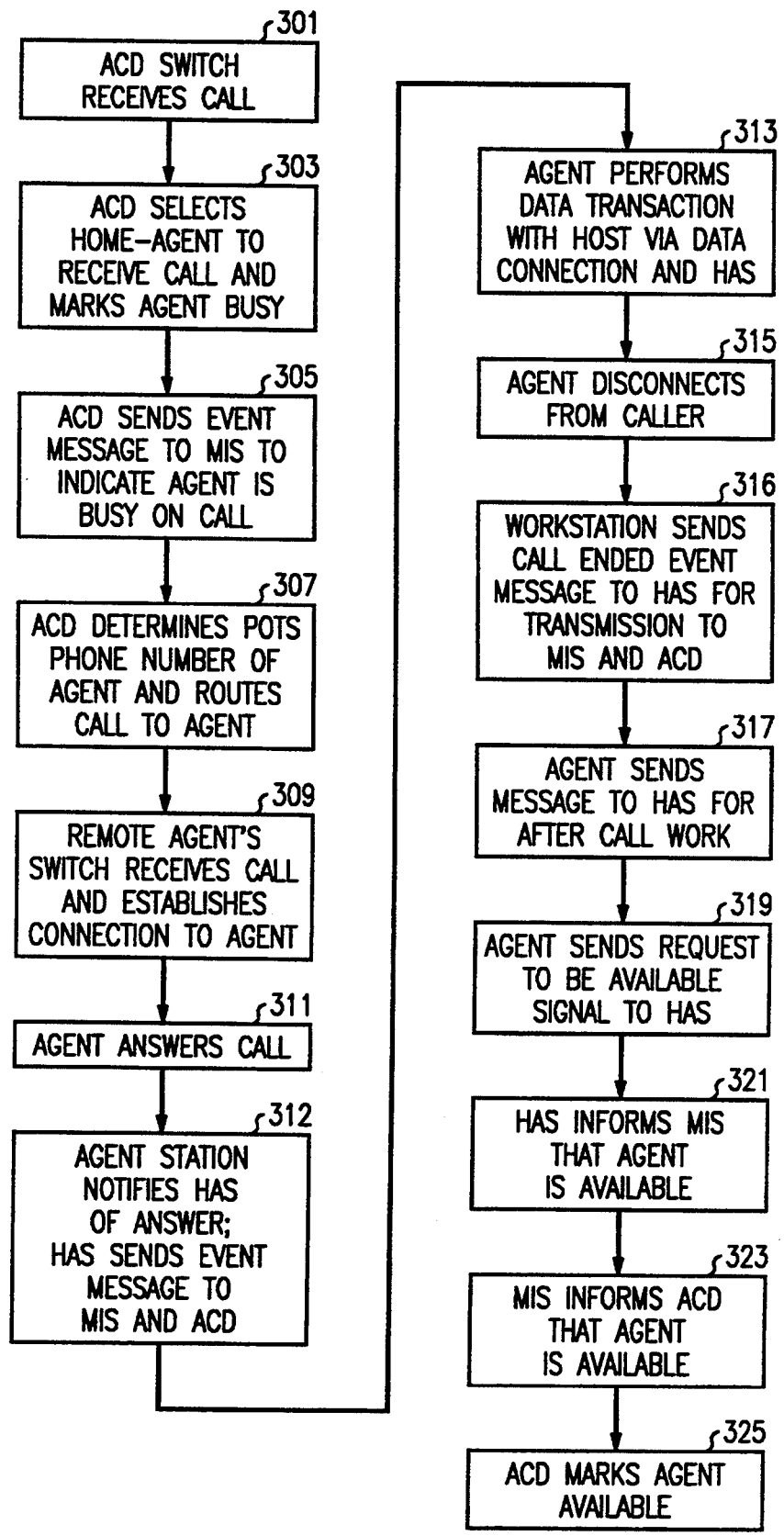

FIG. 3 is a flow diagram illustrating the processing of a call that is routed to the remote agent. The ACD switch receives a call for an agent of that ACD (action block 301 ). The ACD selects the home agent to receive the call (because it is the turn of that agent to process the call) and marks that agent busy (action block 303). The ACD sends an event message to MIS 8 to indicate that the agent is busy on a call (action block 305). The ACD determines the POTS (Plain Old Telephone Service) phone number of the agent and routes the call to the agent (action block 307). Alternatively, the agent station 3 can be accessed via any dialable number, and the access can be through a Private Branch Exchange (PBX) or a key telephone system. The remote agent's switch 2 receives the call and establishes the connection to that agent (action block 309). The agent answers the call (action block 311) and provides an event message to the HAS which informs the MIS 8 and switch 1 (action block 312). The agent then talks to the caller and performs data transactions with the host processor 7 via the data connection and the HAS (action block 313). Eventually, the agent disconnects from the caller (or vice versa) (action block 315). The work station sends a call ended event message to the HAS and the HAS informs the MIS and the switch of this event (action block 316). The agent then continues to send messages to the HAS for after-call work (action block 317). This after-call work is in the form of communications with host processor 7. Eventually, the agent sends a request to be made available signal to the HAS (action block 319) and the HAS informs the MIS that the agent is now available (action block 321). The MIS then informs the ACD that the agent is available (action block 323) and the ACD feature of switch 1 marks the agent available for another call (action block 325).

Figure 4:
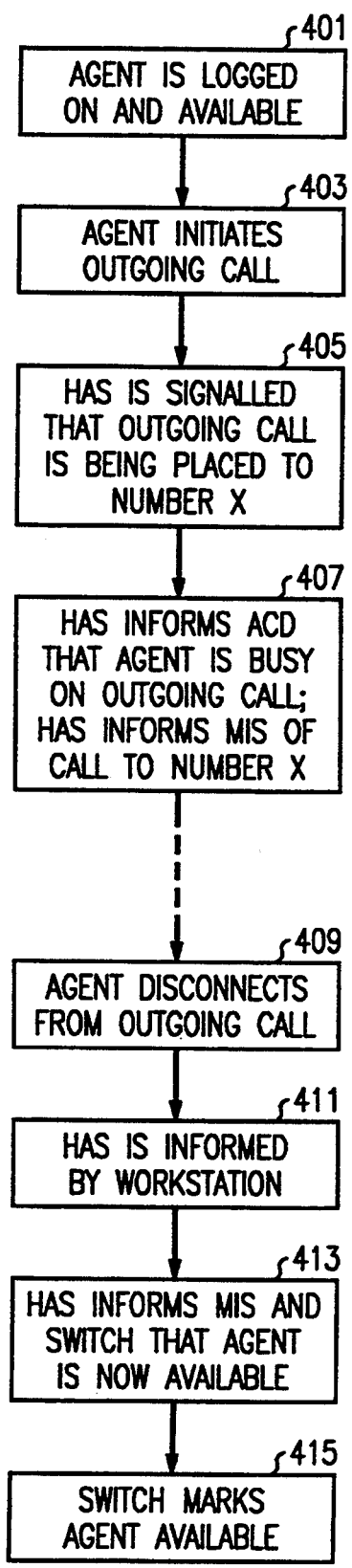

FIG. 4 illustrates the actions performed when the agent makes an outgoing call without logging off. During this time the agent is not available for receiving incoming calls. In the initial state, the agent is logged in and available (action block 401). The agent then initiates an outgoing call (action block 403). The HAS is signaled that an outgoing call is being placed to number X (action block 405). The HAS informs the ACD that the agent is busy on an outgoing call and the HAS informs the MIS of a call to number X (action block 407). Some time later, the agent disconnects from the outgoing call (action block 409) and the HAS is informed by the work station of the disconnect (action block 411). The HAS informs the MIS and switch 1 that the agent is not available (action block 413) and switch 1 marks the agent available to process new calls (action block 415).

Many agents have their own telephone numbers by which they may be reached directly on incoming calls. If someone calls the telephone number of an idle remote agent, the call can be accepted and the HAS informed. The HAS informs the MIS for record purposes, which informs the switch to make the agent busy. When that call is disconnected, the HAS is informed, and the HAS informs the MIS; the MIS records the disconnect and informs the switch, which makes the agent available for ACD calls. The agent can also have call waiting for outside (non-ACD calls) on hold. The HAS is informed of these events and informs the MIS which makes a record. The agent status remains busy in the ACD switch in these cases.

Figure 5:
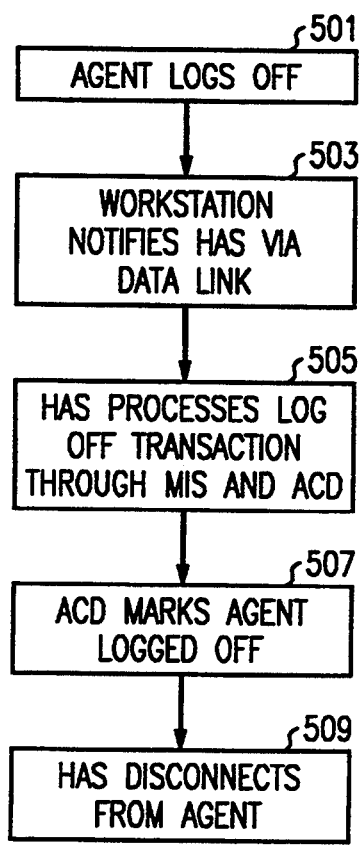

FIG. 5 illustrates the process of logging off. The agent initiates the logoff (action block 501). The work station notifies the HAS via the data link of the logoff request (action block 503). The HAS processes logoff transaction through the MIS and ACD (action block 505). The ACD marks the agent logged off (action block 507), and the HAS disconnects its data link from the agent (action block 509).

I claim:

1. A method of providing automatic call distributor (ACD) service for an ACD system, said ACD system served by a first switching system, from an agent station connected to a second switching system different from said first switching system, said method comprising the steps of:

establishing a data connection from said agent station to a home agent server (HAS) unit for communicating agent status data to said ACD system;

responsive to receipt of an incoming ACD call for said ACD system, determining whether said agent station is available and is an appropriate candidate for serving said incoming call;

responsive to determining that said agent station is available and is an appropriate candidate for serving said incoming call, establishing an audio path from said incoming call to said agent station via a public switched telephone network connection between said first and said second switching systems, said audio path being separate from and independent of said data connection.

2. The method of claim 1 further comprising:
   accessing a host computer serving said ACD for providing application data to said agent station from said HAS over said data connection.

3. The method of claim 1 further comprising:
   providing agent status data to a Management Information System (MIS) from said HAS.

4. The method of claim 1 further comprising:
   logging on from said agent station to said
   and responsive to successful processing of a logon from said agent station, said HAS unit informing said ACD system that said agent is logged on.

5. The method of claim 1 further comprising:
   maintaining availability status for agents of said ACD including said agent station;
   wherein the step of establishing an audio connection is performed responsive to receipt of a call by said ACD system and responsive to said agent station being available in a record of status of agents of said ACD system.

6. The method of claim 1 further comprising:
   said agent station making an outgoing call;
   said agent station informing said HAS unit that an outgoing call is being made;
   and said HAS unit informing said ACD system that said agent station is not available for ACD calls.

7. The method of claim 1 further comprising:
   responsive to receipt of a signal indicating that said agent station is busy said HAS unit informing the ACD system that said agent station is unavailable.

8. In a first switching system, apparatus for serving agents of an automatic call distributor (ACD), said apparatus comprising:

means for receiving data messages from an agent station, said agent station served by a second switching system different from said first switching system;

means, responsive to a receipt by said means for receiving data messages of an agent availability message from said agent station, for informing said ACD of availability of said agent station for serving calls;

means, responsive to receipt of an incoming call to said ACD, for determining whether said agent station is available and is an appropriate candidate for serving said incoming call; and means, responsive to a determination that said agent station is available and is an appropriate candidate for serving said incoming call, for establishing an audio connection between said first switching system and said second switching system for serving said call, said audio connection being separate from and independent of a path for transmitting said data messages to said means for receiving 9. The apparatus of claim 8 further comprising:

means responsive to a receipt of a log on message from said agent station for informing said ACD that said agent station is logged on.

10. The apparatus of claim 8 further comprising:

means responsive to a receipt of a message from said agent station indicating that said agent station has initiated an outgoing call for informing said ACD of unavailability of said agent station.

11. The apparatus of claim 8 further comprising:

means responsive to a receipt of a call event message from said station for notifying a management information system (MIS) of said call event for said station.

* * * * *

UNITED STATES PATENT AND TRADEMARK OFFICE
CERTIFICATE OF CORRECTION

PATENT NO. : 5,392,345

DATED : February 21, 1995

INVENTOR(S) : Mary R. Otto

It is certified that error appears in the above-identified patent and that said Letters Patent is hereby corrected as shown below:

Column 4, claim 4, line 26, after the second occurrence of "said" insert --HAS;--.

Signed and Sealed this

Thirty-first Day of October 1995

Attest:

Attesting Officer

BRUCE LEHMAN

Commissioner of Patents and Trademarks